United States Patent

[11] 3,570,470

| [72] | Inventor | Franklin D. Milum<br>Granger, Wash. (Rte. 2, Box 145, Prosser, Wash. 99350) |
|---|---|---|
| [21] | Appl. No. | 819,823 |
| [22] | Filed | Apr. 28, 1969 |
| [45] | Patented | Mar. 16, 1971 |

[54] SPACE HEATER
3 Claims, 3 Drawing Figs.

[52] U.S. Cl............................................ 126/59.5,
431/242
[51] Int. Cl...................................................... A01g 13/06
[50] Field of Search........................................ 126/59.5;
431/242 (X)

[56] References Cited
UNITED STATES PATENTS

| 2,260,548 | 10/1941 | Veghte....................... | 126/59.5X |
| 3,409,000 | 11/1968 | Brader et al................. | 126/59.5 |
| 3,409,001 | 11/1968 | Franke....................... | 126/59.5 |

FOREIGN PATENTS

| 355,645 | 8/1961 | Switzerland................. | 126/59.5 |
| 1,216,387 | 11/1959 | France....................... | 431/242 |

Primary Examiner—Charles J. Myhre
Attorney—Ford E. Smith

ABSTRACT: A space heater having an upright tubular combustion chamber has a pan closing the bottom of the chamber and provided with a central fuel atomizing means positioned in an aperture. A conduit delivering fuel to said atomizing means from beneath the pan includes an upstanding loop rising above said pan within said chamber in close proximity to fuel sprayed from said atomizing means. The aperture surrounds the fuel atomizing means and is disposed in a plane of the pan bottom.

Patented March 16, 1971  3,570,470

INVENTOR
FRANKLIN D. MILUM
BY Ford E. Smith
ATTORNEY 3,570,470

SPACE HEATER

SUMMARY OF THE INVENTION

This invention relates to space heaters particularly for use as orchard heaters to combat frost that may be damaging to a budding, flowering and fruiting vegetation. It is among the more important objects of this invention to provide an efficient space heater which achieves substantially complete combustion of liquid fuel within the heater and avoids the emission of smoke and unburned fuel in particulate form; and which overcomes problems of carbon formation in the combustion chamber and, particularly, carbon accumulations on the fuel atomizing means and the like. Another object of the invention is to prolong and extend efficient atomization of fuel at a nozzle by cooling the same by means of an incoming air stream in extremely close proximity to the nozzle and its orifice. Still a further object of the invention is concerned with the avoidance of the discharge of raw fuel to the supporting and surrounding ground to avoid contamination of the earth and the possibility of uncontrolled and efficient burning of the same. Accordingly, the invention is a space heater comprising an upright sleeve defining a combustion chamber, the sleeve rising an upright sleeve defining a combustion chamber, the sleeve rising from a legged pan which telescopically joins with the sleeve. The pan forms the bottom of the combustion chamber and includes a centrally located aperture disposed in a plane elevated above the pan bottom the pan being otherwise imperforate. Fuel atomizing means is located in said aperture, and a fuel conduit supplies fuel to the atomizing means. The conduit passes beneath the pan and includes an upstanding loop rising above the pan bottom at one side of the fuel atomizing means in close proximity to the inverted conical fuel spray emanating therefrom. In a preferred form the loop is substantially concentric of the fuel atomizing means. Also, in another preferred the central aperture is surrounded by an outward and downward sloping wall merging with the pan bottom.

DESCRIPTION OF THE PREFERRED EMBODIMENT

Figure 2:
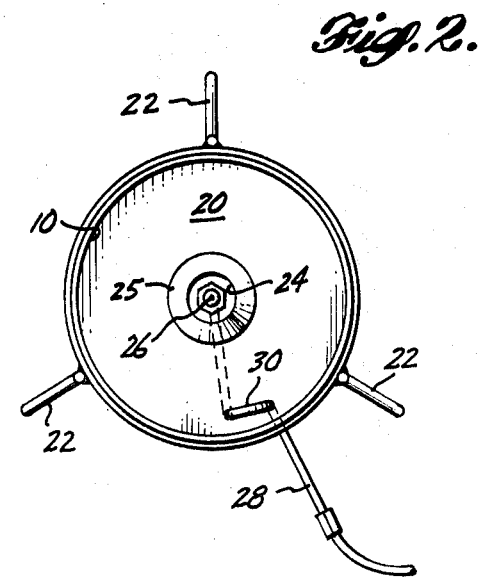
FIG. 2 is a plan view of the legged pan of this space heater.

The space heater of this invention is intended to be used in a system wherein there is a source of fuel, usually contained in a large, centrally located storage tank, from which the fuel is drawn and pressurized by pumping means and thence transported by main and lateral conduits to a plurality of space heaters usually geometrically distributed throughout an orchard or the like in accordance with a pattern determined by the orchardist as suitable to combat frost that might otherwise be damaging to the orchard.

The upstanding sleeve 10 defines a combustion chamber for a fuel-air mixture created therein. In the desired form the sleeve or stack 10 may have a height varying from about 30 inches up to about 42 inches and a diameter of about 9 inches. Sleeve 10 may be tapered in which case it is frustoconical in shape. A plurality of apertures 12 and 14 permit the inward passage of air from external of the sleeve to the interior chamber. In general, the lower apertures 12 are substantially larger than apertures 14. The lower end 16 of sleeve 10 may be corrugated in stove-pipe fashion. Pan 20 has a marginal upstanding rim suitably sized to receive in telescopic fashion the lower end 16 of sleeve 10. Pan 20 supports sleeve upright in spaced relation above the ground by means of legs 22 which are desirably rodlike in shape so that they may be pressed into the ground to securely anchor the heater in upright position.

Figure 1:
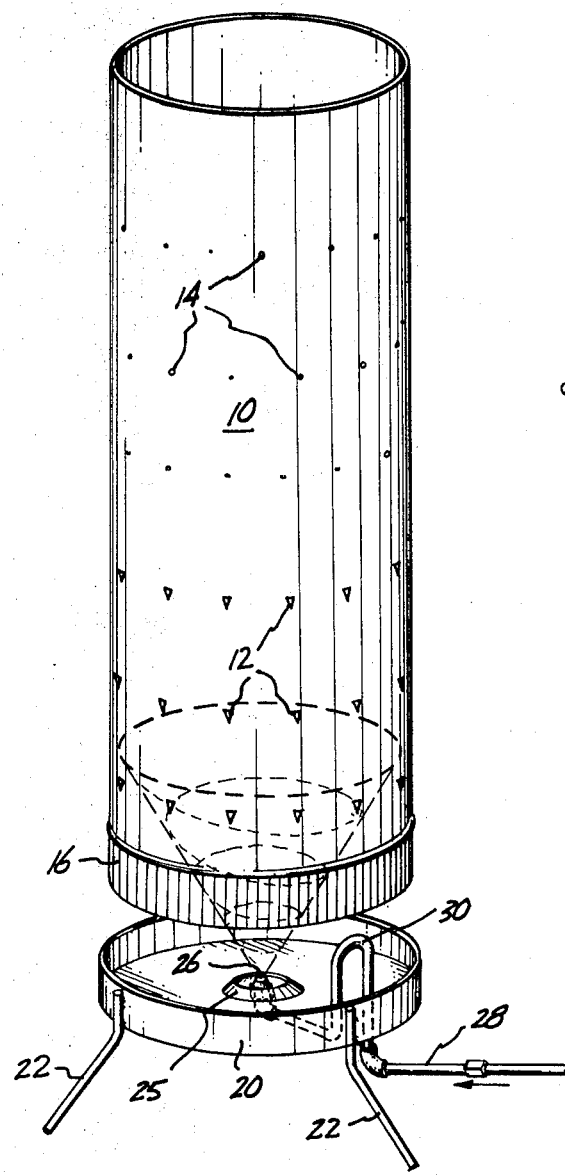
FIG. 1 is a perspective view, partially exploded, of a space heater according to this invention.
Figure 3:
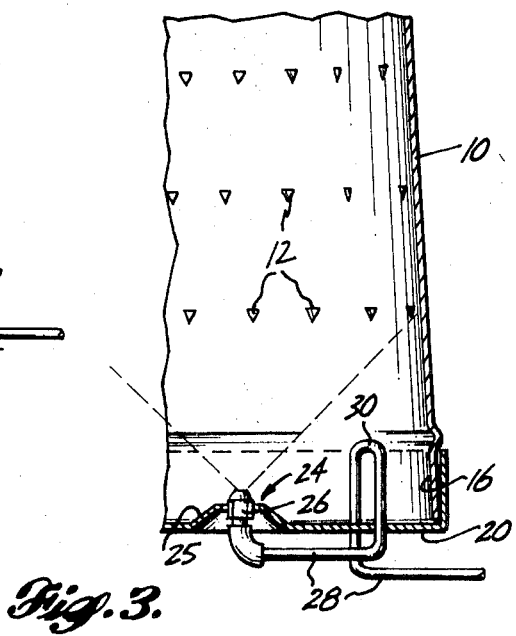
FIG. 3 is a partial vertical sectional view of the lower portion of the space heater, parts being broken away and omitted for convenience of illustration.

Pan 20 forms the bottom of the combustion chamber, defined by sleeve 10 and includes a central aperture 24 which is located in a plane elevated above the pan bottom as best shown in FIGS. 1 and 3. This upward positioning of aperture 24 is obtained by forming the center portion of the pan in a frustoconical shape whereby its sloping wall 25 extends outward and downward and merges with the pan bottom.

Nozzle 26 is centrally located in aperture 24 and is supplied with fuel under pressure by means of conduit 28 which passes beneath the pan bottom as it progresses toward the center of the pan. An upstanding loop 30 of conduit 28 extends upward through the pan at one side of the nozzle 26 in close proximity to the fuel spray and flame emitting therefrom.

Nozzle 26 is of the type that fuel sprayed therefrom assumes an inverted conical shape as indicated in FIG. 1. It is desirable that the loop 30 not be disposed within the fuel spray pattern. It is further desirable that loop 30, as shown best in FIG. 2, is substantially flat on or concentric of the fuel atomizing means at the center of pan 20; Loop 30 functions when combustion has been initiated to absorb heat and to impart the same to the entering fuel as it flows through conduit 28, thus facilitating substantially immediate ignition of the fuel upon its being discharged into the combustion chamber and mixed with air entering in close proximity to nozzle 26 through aperture 24. The ingress of air through aperture 24 cools the nozzle and its orifice. The sloping surface 25 by which means the aperture 24 is elevated above the pan bottom tends to direct the inlet air at the nozzle at a point where it is immediately available for mixture with the raw fuel particles as they discharge from the nozzle.

In the operation of an orchard-heating system of the type in which this invention is particularly applicable, it is customary to start the pump in operation to cause fuel to flow through the conduits. Then an operator or attendant goes from space heater to space heater with an ignitor which he applies to introduce flame and, hence, initiate combustion. It will be obvious that all the heaters cannot practically be ignited simultaneously. Therefore, there will be some accumulation of raw fuel discharged at the nozzles prior to the application of the ignition flame. The elevated position of orifice 24 permits such raw fuel to accumulate within pan 20 and not to be discharged in the ground. As rapidly as the internal temperatures in the combustion chamber rise, this fuel is volatized and is burned, but in such manner that at the most there is a minimum of smoking. However, this is practically undetectable.

Desirably, the discharge orifice of nozzle 26 is located at the point of convergence of sloping wall 25 so that air entering the pan through aperture 24 from beneath and flowing substantially axisward impinges upon the nozzle in very close proximity to the orifice. This intimate association of the entering air and the raw fuel is most desirable for substantially complete mixing of the fuel and air and efficient combustion of the fuel spray particles.

It will be apparent to those skilled in the art that changes and modifications may be desirable in the practical application of this invention as has been described in its preferred form. All that fall within the scope of the principles are considered a part hereof.

I claim:

1. A space heater comprising:
   a sleeve defining a combustion chamber for fuel-air mixture;
   a legged pan marginally rimmed to telescopically receive and support said sleeve in upright position;
   said pan forming the bottom of said chamber and including means defining a central aperture disposed in a plane elevated above said pan bottom, said pan being otherwise imperforate;
   fuel atomizing means disposed in said aperture and operable to produce an inverted conical fuel spray within said chamber; and
   a fuel conduit connected to said fuel-atomizing means and extending outward therefrom beneath and beyond said pan, said conduit including an upstanding loop rising within said chamber above said pan bottom at one side of said fuel-atomizing means in close proximity to but out of said inverted conical fuel spray.

2. The structure of claim 1 in which said loop is disposed substantially concentric of said fuel-atomizing means.

3. The structure according to claim 1 in which said central aperture is at the apex of a frustoconical annular wall integral with the bottom of said pan.